Jan. 21, 1930.  W. J. MILLARD  1,744,408
AUTOMOBILE BUMPER GUARD
Filed July 18, 1929
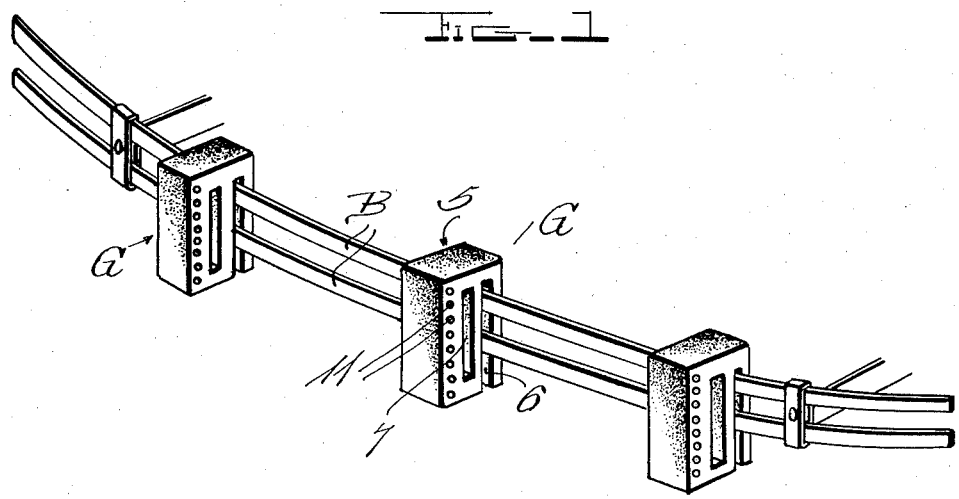
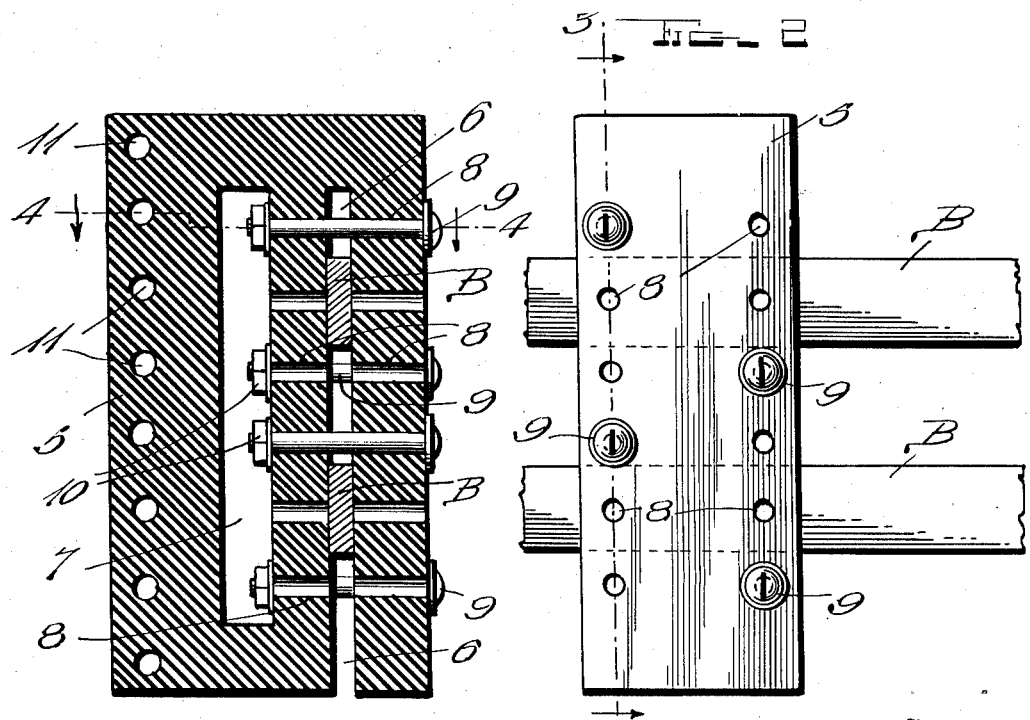
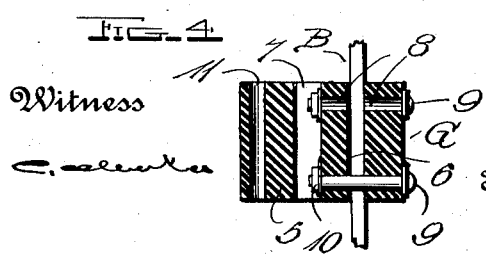
Inventor
William J. Millard, Patented Jan. 21, 1930

1,744,408

UNITED STATES PATENT OFFICE

WILLIAM J. MILLARD, OF NEW YORK, N. Y., ASSIGNOR OF ONE-HALF TO ALEXANDER WOLF, OF NEW YORK, N. Y.

AUTOMOBILE BUMPER GUARD

Application filed July 18, 1929. Serial No. 379,233.

The invention aims to provide a new and improved resilient bumper guard for attachment to automobile bumpers, providing a means of protecting the bumper, protecting the car and preventing injury to any other machines which may be struck. The device is simple, inexpensive, easily attached, softens all blows and prevents breaking, cutting, jamming or defacing any parts coming into contact therewith. At the same time, it protects without marring the appearance of the car.

The invention is illustrated in the accompanying drawing forming a part of this specification.

Fig. 1 is a perspective view showing a plurality of the guards applied to a bumper.

Fig. 2 is an enlarged front elevation.

Fig. 3 is a vertical sectional view on line 3—3 of Fig. 2.

Fig. 4 is a horizontal sectional view on line 4—4 of Fig. 3.

Any desired number of the improved guards G may be used upon a bumper B constructed in any of the well known ways.

Each guard G is formed primarily from a single vertically elongated, rectangular block 5 of resilient material such as rubber. Near its rear portion, this block is formed with a vertical slot 6 which is open at one end of the block, (preferably the lower end of the latter) and is also open at opposite vertical sides of said block, adapting the latter to be slipped astride of the conventional bumper. The slot 6 is preferably nearer to the rear side of the block 5 than to the front side of the latter, and a second slot 7 is formed through said block in front of said slot 6. Vertically spaced bolt holes 8, preferably formed in two series, are formed in the block 5, from the rear side of the latter to the second slot 7. Bolts 9 may be passed through these bolt holes at suitable intervals and the nuts 10 of said bolts are received in the slot 7, so that upon tightening of them, the block portions in front of and behind the slot 6, will be tightly clamped against the bumper.

Preferably, there is quite a body of rubber in front of the slot 7 and to render it of more shock-absorbing nature, it may be provided with a plurality of openings such as 11.

By providing the novel construction shown and described or a substantial equivalent thereof, a device is provided which will well attain the ends for which it is designed, regardless of its simple and inexpensive nature.

While it is preferable that the upper and lower ends of the slots 7 be closed and that said slot be open through opposite vertical sides of the block 5, it is possible that a different arrangement might be used in which the slot 7 opened in some other direction or directions but still permitted insertion of the nuts 10.

The details illustrated and described are preferably followed but variations such as that above suggested, may be made within the scope of the invention as claimed.

I claim:

1. A bumper guard comprising a resilient block having a vertically disposed slot open at one end of said block and at opposite vertical sides of the latter, adapting the block to be slid vertically astride an automobile bumper, the portions of the block in front of and behind said slot being integrally joined, and means for securing said block in place upon the bumper.

2. A bumper guard comprising a resilient block having a vertically disposed slot open at one end of said block and at opposite vertical sides of the latter, adapting the block to be slid vertically astride an automobile bumper, the portions of the block in front of and behind said slot being integrally joined, said block being formed with a second slot in front of the first-named slot and having vertically spaced openings from the rear side of the block to said second slot, bolts for passage through said openings, and nuts for said bolts receivable in said second slot.

3. A bumper guard comprising a resilient block having a vertically disposed slot open at one end of said block and at opposite vertical sides of the latter, adapting the block to be slid vertically astride an automobile bumper, the portions of the block in front of and behind said slot being integrally joined, said block being formed also with a second vertical slot in front of the first-named slot, said second slot being closed at both ends of the block but open at said opposite vertical sides thereof, the block being provided with vertically spaced bolt holes from its rear side to said second slot, bolts for passage through said bolt holes, and nuts for said bolts receivable in said second slot.

In testimony whereof I have hereunto affixed my signature.

WILLIAM J. MILLARD.